United States Patent Office 2,859,120
Patented Nov. 4, 1958

2,859,120

FLAVOR-STABLE REARRANGED FATS FROM DOMESTIC OILS

Walter M. Cochran, Highland Park, Claude W. Lantz, La Grange, and Melvin L. Ott, Park Ridge, Ill., assignors to The Glidden Company, Cleveland, Ohio, a corporation of Ohio No Drawing. Application July 12, 1954
Serial No. 442,882

3 Claims. (Cl. 99—118)

This invention relates to novel fats prepared from mixtures of domestic oils by hydrogenating such oils of the mixture as tend to revert, thereby to overcome flavor-reversion tendencies, and then rearranging the mixture. The use of this combination of treatments permits extensive expansion of the usage in commerce of various domestic oils and fats which heretofore have enjoyed limited usage in edible products and/or have been considered inappropriate for use in edible products. Accordingly, the combination of treatments imparts increased flexibility and latitude in selecting available domestic oils and fats for conversion into high grade edible products.

Accordingly, it is an object of this invention to provide novel flavor-stable rearranged fats derived from mixtures of available domestic triglyceride raw materials.

It is another object to provide a novel process for preparing the fats described in the preceding object.

These and other objects will be apparent from the following description of the invention.

Various edible grade beef fats such as oleo stearine, tallow, oleo oil, various fish oils, various vegetable oils such as soybean oil, corn oil, and other oils available in the continental United States and neighboring countries of North America have long been known to be of the "reverting" type; that is, by their nature they tend to turn rancid and hence to revert to their original crude or natural flavor. Other domestic oils such as cottonseed oil, peanut oil, lard, sesame oil and others are fairly stable in flavor and do not revert easily to their crude or natural flavor. The latter oils have been used widely in edible products for this reason, but the demand for them and the resulting price level induces the use of other domestic triglycerides which can, by appropriate processing, be used in their place. The "reverting" oils mentioned above have not been used as widely in edible products as their chemical nature should permit, largely because of their flavor-reversion tendencies. It has long been known that the reversion tendencies are connected in some manner with unsaturation in the 6–24 carbon fatty acid radicals of at least some of the triglycerides which constitute the oils, and it has long been known that moderate to extensive hydrogenation of the oils reduces the unsaturation and overcomes the reversion tendencies. Appropriate hydrogenation (sufficient to impart flavor-stability equal to 94° hydrogenated cottonseed oil) has thereby made it possible to use many of the oils in edible products. Nevertheless, hydrogenation has the effect of hardening the oils, and in numerous instances the amount of hydrogenation necessary to overcome flavor reversion has so hardened the oils as to make them of limited usefulness in edible products such as shortenings, hard butters, cooking oils, etc. We have now discovered that such hardening can be overcome by rearranging each of the hydrogenated oils or mixtures thereof in admixture with other domestic non-reverting oils. The latter can be natural, non-reverting oils of the kinds mentioned hereinabove, and/or can be normally-reverting oils which have been hydrogenated sufficiently to be flavor stable, i. e., until they possess a stability against reversion equal to 94° hydrogenated cottonseed oil. The mixtures can be selected as to kinds and proportions of oils present, and as to amount of residual unsaturation, so that after rearrangement they will yield a wide range of physical properties in the treated mass of fat. Thus the starting mixture can be selected on the basis of principles and characteristics available to those skilled in the art so that on rearrangement the mixture will give fats useful as or in shortenings, hard butters, cooking oils, specialty fat products for the food industry, etc. Accordingly, the present process affords widened latitude in the choice of the raw or starting materials which can be used to prepare almost any of the more common edible fat products, and hence imparts flexibility in their manufacture and less dependence on fluctuations in supply and price of the oils commonly demanded in the past.

The benefits of the invention in the shortening field are illustrated by the following considerations.

Most all shortenings are prepared by adding various amounts of stearine to a soft unhydrogenated or partially hydrogenated base oil. The base oil is stable against oxidation or reversion only to the extent to which the poorest oil used therein tends to be stabilized by the amount of hydrogenation permissible. If, for instance, the base oil were to be a blend of soybean and cottonseed oil and a final congeal point of 25° was required, the base oil under normal hydrogenation would only be as stable as 25° soybean oil. With our invention, when a blend of two oils is to be used to make the base stock, we hydrogenate the reverting type to a point where (a) the stability against reversion is at least equal to 94° hydrogenated cottonseed oil, and (b) the hardness is appropriate for the next step. We then rearrange this material in admixture with the selected non-reverting component, it being understood that the latter already has been hydrogenated, where necessary, to impart a hardness which is known by experience to give the rearranged blend the desired congeal point. In many instances this congeal point can be reached on rearrangement without hydrogenating any of the oil(s) except the normally-reverting oil.

Following are a few examples of shortening base oils which can be prepared in this manner. The intent and result in each case is to stabilize the final rearranged product against reversion by highly hydrogenating the unstable component prior to rearrangement. Rearrangement of the blends in each case is necessary and/or desirable because without rearrangement the mixtures would be too hard to use as shortening base oils.

(1) 50% cottonseed oil hardened to 20° congeal
    50% soybean oil hardened to 35° congeal
(2) 75% 20° congeal cottonseed oil
    25% tallow stearine
(3) 75% liquid peanut oil
    25% tallow stearine
(4) 40% liquid peanut oil
    60% 40° congeal soybean oil
(5) 80% liquid lard
    20% fish oil stearine
(6) 60% liquid lard
    40% 10 I. V. drop hydro tallow The rearrangement treatment (also known as interesterification) which we contemplate is that which is commonly referred to as "low-temperature" rearrangement, using such catalysts as are known to be effective at temperatures below about 250° F., using temperatures which continuously maintain the mass of fat in a liquid or single-phase condition, and using other operating conditions favorable to the selected catalyst. Such rearrangement treatment is one of short duration, but one which gives fully rearranged material at a low overall processing cost.

As indicated above the catalyst is a low temperature rearrangement catalyst such as the alkali metal alkoxides having up to 4 carbon atoms, alkali metal hydrides such as sodium hydride, and numerous others such as are described in the Eckey U. S. Patent No. 2,442,536. Other alkaline compounds such as lithium aluminum hydride and calcium hydride have been found by us to be ineffective, as have such catalysts as aluminum isopropylate. We are aware of the Gooding U. S. Patent 2,309,949 in which a variety of alkaline-reacting compounds are employed in combination with hydroxyl-carrying materials, but such catalysts and/or the high reaction temperatures involved in their use lead to less desirable results than we obtain.

Small amounts of the low temperature rearrangement catalysts are employed in the treatment, as little as .02% of sodium methoxide by weight on the mixture of glycerides being effective when conditions are such that it is in an active condition. Most of the catalysts induce an exothermic reaction and such exothermicity becomes increasingly difficult to work with as the amount of catalyst is increased. Moreover, losses of glycerides then tend to be increased and more saponification tends to occur. For these reasons we avoid the use of more than about 1% of catalyst. We prefer to use between about 0.1% and 0.5% of such active catalysts as sodium methoxide, sodium ethoxide or sodium hydride, and prefer a chemically equivalent percentage of other active low-temperature catalysts.

The catalyst is easily destroyed or inactivated by water, moisture, carbon dioxide and air. Accordingly, in order to provide treating conditions which are favorable to activity on the part of the catalyst, the mixture of triglycerides should be thoroughly dry, and contact with the moisture and carbon dioxide of the air must be prevented. We have found that an inert atmosphere such as hydrogen, nitrogen or vacuum is very effective. When an inert gaseous atmosphere of hydrogen or nitrogen is maintained over the mixture of glycerides, the treatment can be effectively carried out in a loosely-covered container. Preferably, however, the treatment is conducted in a vacuum chamber since by heating the mass to expeditious reaction temperatures in a vacuum of around 0.1 to 0.2 inch of mercury or lower, the glycerides can be dried effectively. Nitrogen can then be introduced for agitation and blanketing purposes to reduce the vacuum to about 1.5 inches gauge pressure. Mechanical agitation can also be used. The container may be of iron, stainless steel, glass or aluminum. However, when aluminum is used, the amount of catalyst must generally be increased.

The catalyst is also destroyed by free acids and by peroxides. Accordingly, the glycerides which are to be treated should have been refined in advance with alkalis or otherwise to reduce the free fatty acid content to about .05% or lower, and to eliminate peroxides as far as possible. It should be understood that the provision of refined triglycerides and of other conditions favorable to the catalyst is done mainly in the interest of economizing the catalyst. The consequence of not making such provisions is simply that the quantity of catalyst which must be introduced to overcome all such unfavorable factors is wasted.

As indicated above, the temperature of the catalytic treatment can be varied over an appreciable range. When solvents are employed, temperatures as low as room temperature have been employed successfully. When the treatment is conducted in the absence of solvents, the temperature should at least be high enough to maintain the mass in the liquid phase throughout the catalytic treatment. The minimum temperature will, of course, then depend on the particular mixture of triglycerides which is being treated. Temperatures as high as 250° F. have been used successfully in vacuum equipment in the absence of solvents, but we prefer to use temperatures around 200°–240° F. in such vacuum equipment as they lead to low losses of material and to the formation of but little soap. Temperatures above about 250° F. are avoided because of catalyst decomposition and because of the exothermicity of the reaction and the disadvantageous results attendant thereon, as mentioned above.

The effectiveness of the catalyst and of the treatment can be determined by the changed physical properties of the mass, but we have also found that it is easily determined by the color of the mass of glycerides. The color of the mass changes from its original color to a reddish-brown color when the rearrangement reactions have been completed. If no such color change is observed within a few minutes after the catalyst has been added, it signifies that something has deactivated the catalyst. Frequently the initial addition of the catalyst almost cures the difficulty, and the rearrangement will be found to occur on the further addition of a small quantity of catalyst. Likewise, when only a slight color change is observed, it may signify that the catalyst was initially active but was soon inactivated. A further addition of catalyst will then cause the reaction to go to completion. We have observed that the rearrangement reaction goes to completion in the space of a few minutes if sufficient active catalyst is present. The addition of more catalyst under such conditions produces no further change, nor does holding the mass for a prolonged period of time cause any material change.

After the catalytically-induced rearrangement reaction has been completed, the mass can be cooled sufficiently to permit it to be washed with water or dilute acids so as to decompose the catalyst. Such washing is preferably done at temperatures around 170–180° F. since there is little tendency at such temperatures for an emulsion to be formed. The washed material can then be stratified and the water separated from the mass of treated oil. The oil can then be dried by applying vacuum with or without further heating. The drying operation can, of course, be done in any of the other ways well known to those skilled in the art.

The following examples illustrate the principles of our invention:

EXAMPLE 1

A blend of 90% liquid lard and 10% tallow stearine was rearranged with sodium methoxide at 220° F. and deodorized.

| | Properties of Blended Fats | |
|---|---|---|
| | Before Rearrangement | After Rearrangement |
| Refractive Index at 48° C | 45.30 | 45.00 |
| Congeal Point, ° C | 36.9 | 33.9 |
| Wiley Melting Point, ° F | 115.0 | 109.0 |
| Capillary Melting Point, ° F | 118.0 | 115.0 |
| Iodine Value | 62.0 | 62.0 |

The deodorized rearranged fat mixture had a good bland flavor and a Schall test of 6 days. No animal odor could be detected while running this test.

EXAMPLE 2

An edible tallow having the properties listed below was refined and bleached and then was partially hardened.

| | | |
|---|---|---|
| Color | 3.6R–105Y | |
| Free Fatty Acids (Oleic), percent | 1.35 | |
| Refractive Index at 48° C | 42.70 | 40.9 |
| Congeal Point, ° C | 33.4 | 47.0 |
| Wiley Melting Point, ° F | 106.5 | 122.0 |
| Iodine Value | 47.5 | |

The refined, bleached, edible tallow used in the hardening was 0.2R–2Y—0.026% free fatty acids. Using the resulting partially hardened tallow, 10 parts thereof and 90 parts of liquid lard were blended together after which the blend was rearranged with sodium methoxide at 220° F. and analyzed for the following properties:

|  | Properties of Blend | |
|---|---|---|
|  | Before Rearrangement | After Rearrangement |
| Refractive Index at 48° C | 46.0 | 45.6 |
| Congeal Point, °C | 28.3 | 27.7 |
| Wiley Melting Point, °F | 99.0 | 98.0 |
| Capillary Melting Point, °F | 106.7 | 102.2 |

It will be observed that the low-temperature rearrangement significantly lowered the congeal point and melting points.

EXAMPLE 3

A blend of liquid lard plus hydrogenated tallow duplicating the properties of the 90–10 mixture of Example 1 was sought. A mixture of 60% liquid lard with 40% of the partially-hardened tallow of Example 2 was found to accomplish this result. This mixture was rearranged at 220° F. with 0.2% sodium methoxide to give the following properties:

|  | Before Rearrangement | After Rearrangement |
|---|---|---|
| Refractive Index at 48° C | 44.3 | 43.7 |
| Congeal Point, °C | 38.0 | 34.8 |
| Wiley Melting Point, °F | 113.0 | 107.0 |
| Capillary Melting Point °F | 118.0 | 111.2 |

Both fat products (before and after rearrangement) were deodorized and Schall tests were determined:

|  | Before— | After— |
|---|---|---|
| Schall Test at 145° F | 11 days | 7 days |

Neither fat product had lardy or tallowy flavors and no tallowy odors developed during the Schall test.

EXAMPLE 4

In a standard wet creaming test for non-emulsified shortenings the following materials are mixed together and tested as stated:

530 grams 6/X sugar
414 grams shortening
56 grams water
All ingredients at 75° F.

Place these ingredients in 3-quart Hobart bowl, mix ½ minute at first speed, scrape down bowl and beater. Mix at second speed for 25 additional minutes, getting Specific Gravity and Temperature and scraping down well at 5, 15 and 25 minutes.

In such creaming test of the rearranged fat prepared in Example 1, the following data was secured:

| 5 Min. | | 15 Min. | | 25 Min. | |
|---|---|---|---|---|---|
| Sp. Gr. | Temp., °F. | Sp. Gr. | Temp., °F. | Sp. Gr. | Temp., °F. |
| .799 | 74 | .609 | 76 | .507 | 78 |

In baking tests on a pound cake formula given below the following results were secured when the shortening was the rearranged product of Example 1 plasticized with 10% of tallow stearine:

| Sp. Gr. | Temp., degrees | Batter | Volum, cc. | Texture |
|---|---|---|---|---|
| .768 | 74 | Smooth | 1,130 | Fine and even; Very nice texture and top. |
| .777 | 77 | Smooth | 1,155 | Fine and even, Exceptionally nice; Very smooth top. |

*Durkee standard pound cake recipe*

|  | Lbs. | Ozs. |
|---|---|---|
| Gran. Sugar | 1 |  |
| Shortening |  | 8 |
| Whole Eggs |  | 8 |
| Salt |  | ½ |
| Cream for 20 minutes on second speed, scrape bowl. | | |
| Liquid Milk |  | 9 |
| Gran. Sugar |  | 1 |
| Add to above: Mix 10 rev. on first speed, scrape bowl. | | |
| Cake Flour | 1 |  |

Add to above: Mix one minute on first speed, scrape bowl and mix 4 more minutes.
All ingredients 75° F.
Take gravity and temperature.
Scale at 18 ozs. Bake at 350° F. for 1 hr. 10 min.

In baking tests with the 140% white layer cake formula given below, the following results were secured when the shortening was the rearranged product of Example 1 plasticized with 10% tallow stearine and modified with added mono-, di-glycerides:

| Plastic Fat Plus | Sp. Gr. | Temp., °F. | Batter | Volume, cc. | Displacement | Texture |
|---|---|---|---|---|---|---|
| 8% SGF[a] | .853 | 72 | Smooth | 1,410 | 1,135 | Fine, nice peaked top. |
| 2½% DPI 18-40[b] | .961 | 72 | Smooth | 1,455 | 1,165 | Slightly coarse, slightly pitted top. |

[a] A commercial mono-diglyceride product of the Durkee Division of The Glidden Company, approximately 40% monoglycerides—40% diglycerides.
[b] A commercial mono-diglyceride product of Distillation Products Company, Inc., approximately 18% monoglycerides—40% diglycerides.

*Standard Durkee white cake formula*

| Cake flour | ounces | 12½ |
|---|---|---|
| Emulsified shortening | do | 10 |

Cream for 2 minutes on low speed, scrape bowl.

| Gran. sugar | ounces | 28 |
|---|---|---|
| Cake flour | do | 7½ |
| Skim milk powder | do | 2½ |
| Salt | do | ¾ |
| Baking powder | grams | 35.5 |
| Water | ounces | 10 |

Cream for 2 minutes on low speed, scrape bowl.

| Egg whites | ounces | 16 |
|---|---|---|

Cream for 2 minutes on low speed, scrape bowl.

| Water | ounces | 7½ |
|---|---|---|
| Vanilla | do | ¼ |

All ingredients—75° F.
Cream for 4 minutes on low speed.
Record specific gravity and temperature.
Scale 14 ounces per 8-inch layer pans.
Bake 21 minutes at 360° oven.

EXAMPLE 5

Sixty parts of 20° congeal hydrogenated cottonseed oil and 40 parts of 35° congeal hydrogenated soybean oil (I. V. about 65) were mixed together and then were rearranged by treatment with 0.2% sodium methoxide at 220° F. A comparison of the properties of the blend before and after rearrangement is given in the following table:

| Property | Before Rearrangement | After Rearrangement |
|---|---|---|
| Refractive Index at 48° C | 48.00 | 48.00 |
| Congeal Point, °C | 28.2 | 26.0 |
| Wiley Melting Point, °F | 98.0 | 91.5 |

EXAMPLE 6

Sixty parts of 35° congeal hydrogenated soybean oil and 40 parts of liquid sesame oil were mixed together and then rearranged by the treatment indicated in Example 5. The properties of the blend before and after rearrangement were as follows:

| Property | Before Rearrangement | After Rearrangement |
|---|---|---|
| Refractive Index at 40° C | 49.50 | 49.50 |
| Congeal Point, °C | 30.6 | 25.7 |
| Wiley Melting Point, °F | 101.0 | 92.0 |

Examples 5 and 6 illustrate the merits in rearranging blends of oils containing one revertible-type oil which has been hydrogenated to improve its stability. It will be noted that the rearranged blends have a Wiley melting point around 92° F., which is a common Wiley for all-purpose shortening oil. It will be noted, however, that without rearrangement neither blend would have met this requirement. To have produced the same Wiley from refined, non-rearranged soybean oil, a congeal point of 26° and an iodine value of 76 would be needed. Thus it will be apparent that the rearrangement has permitted the use of soybean oil having a congeal point 9° higher and an iodine value 11 points lower. Soybean oil of these properties is known to be practically non-reverting. Consequently, rearrangement of the blends has permitted the use of stabilized soybean oil and the preparation of flavor-stable "all purpose" oils where without rearrangement the blends would necessarily have had to contain soybean oil of undesirable reverting tendencies.

Examples 1–3 illustrate similar benefits as the result of rearranging the blends. The products of those examples are equal in flavor stability to straight unhydrogenated lard. In other words, the introduction of tallow has not decreased the stability characteristics of the base oil, and rearrangement of the blends has permitted its use without producing a product much harder than natural lard. For purposes of comparison, the following properties of lard before and after rearrangement are given:

| Property | Before Rearrangement | After Rearrangement |
|---|---|---|
| Congeal Point, °C | 26.5 | 24.5 |
| Wiley Melting Point, °F | 103.0 | 96.0 |
| Capillary Melting Point, °F | 107.0 | 105.0 |

It will be apparent from the foregoing examples and description of our invention that the present invention provides the shortening manufacturer and others working in the triglyceride oil industry with significantly more flexibility in the choice of his raw materials and in the proportions thereof which he can use to prepare products of predetermined physical properties and keeping qualities.

This application is a continuation-in-part of our pending application Serial No. 356,962, filed May 25, 1953, and entitled Rearranged Fat Products and Process. That application describes and claims a process analogous to the present one in which at least one flavor-stabilized, partially-hydrogenated, normally-reverting oil is rearranged with one or more lauric oils, thereby to prepare a shortening-type product suitable for frozen desserts and other specialty products.

Having described our invention, what we claim is:

1. The process of preparing novel fat products from reverting and non-reverting triglyceride fats, said process comprising the steps of: providing a first component comprising unsaturated triglyceride fat which normally turns rancid and develops unpleasant flavor by reason thereof; partially hydrogenating said first component sufficiently to impart thereto a stability against reversion at least equal to 94° hydrogenated cottonseed oil; blending said hydrogenated first triglyceride component with a second and different fat component composed essentially of triglycerides of the normally non-reverting, non-rancidifying type; and catalytically rearranging said blended components at temperatures below about 250° F. while continuously maintaining them in single-phase condition in contact with a low-temperature rearrangement catalyst under conditions favorable to complete rearrangement and to rearrangement activity on the part of said catalyst; subsequently destroying said catalyst; and converting the so-treated mass of completely rearranged triglycerides to a single fat product in an edible state.

2. The process as claimed in claim 1 wherein said normally non-reverting triglyceride component is composed of domestic triglycerides of natural origin.

3. As a novel composition of matter a rearranged, flavorstable triglyceride product prepared by the process of claim 2.

References Cited in the file of this patent
UNITED STATES PATENTS

| | | |
|---|---|---|
| 1,067,978 | Ellis | July 22, 1913 |
| 2,163,603 | Jenness | June 27, 1939 |
| 2,442,532 | Eckey | June 1, 1948 |
| 2,442,537 | Eckey | June 1, 1948 |

FOREIGN PATENTS

| | | |
|---|---|---|
| 590,916 | Great Britain | July 31, 1947 |